(12) United States Patent
Lalancette et al.

(10) Patent No.: US 6,894,222 B2
(45) Date of Patent: May 17, 2005

(54) OUTLET BOX FOR CONCRETE WALLS

(75) Inventors: Daniel Lalancette, L'Acadie (CA); Alain Michaud, St. Luc (CA); Mike DiLillo, Laprairie (CA)

(73) Assignee: Thomas & Betts International, Inc., Sparks, NV (US)

( * ) Notice: Subject to any disclaimer, the term of this patent is extended or adjusted under 35 U.S.C. 154(b) by 2 days.

(21) Appl. No.: 10/681,008

(22) Filed: Oct. 8, 2003

(65) Prior Publication Data

US 2004/0123996 A1 Jul. 1, 2004

Related U.S. Application Data

(60) Provisional application No. 60/416,794, filed on Oct. 8, 2002.

(51) Int. Cl.[7] ................................................ H01H 9/02
(52) U.S. Cl. ............................ 174/58; 174/50; 174/53; 220/3.2; 220/3.9; 248/906
(58) Field of Search ............................... 174/50, 48, 53, 174/54, 58, 57, 61, 62, 63, 17 R; 220/3.2, 3.3, 3.4, 3.6, 3.7, 3.94, 3.92, 3.9, 3.8, 4.02; 248/906, 318, 343; 33/DIG. 10, 528

(56) References Cited

U.S. PATENT DOCUMENTS

| | | | | |
|---|---|---|---|---|
| 4,576,431 A | * | 3/1986 | Thayer | 248/906 |
| 4,757,158 A | * | 7/1988 | Lentz | 174/53 |
| 5,287,665 A | * | 2/1994 | Rath, Jr. | 220/3.3 |
| 5,721,394 A | * | 2/1998 | Mulks | 174/48 |
| 5,773,757 A | * | 6/1998 | Kenney et al. | 174/53 |
| 5,942,726 A | * | 8/1999 | Reiker | 174/58 |
| 6,194,657 B1 | * | 2/2001 | Gretz | 174/53 |
| 6,229,087 B1 | * | 5/2001 | Archer | 174/50 |
| 6,338,225 B1 | * | 1/2002 | Hayes | 174/50 |
| 6,660,936 B1 | * | 12/2003 | Jacks | 174/58 |

* cited by examiner

*Primary Examiner*—Dean A. Reichard
*Assistant Examiner*—Angel R. Estrada
(74) *Attorney, Agent, or Firm*—Hoffmann & Baron, LLP

(57) ABSTRACT

An electrical outlet box having a generally rectangular box having a back wall, a perimetrical side wall surrounding the back wall defining an open front face and a box interior, the side wall comprised of a first and second set of generally parallel spaced apart wall portions, outwardly directed flanges extending from one set of parallel wall portions adjacent the open front face; and fastening structures integrally formed with and attached to the flanges for rigidly mounting the electrical outlet box to a structural member.

15 Claims, 4 Drawing Sheets

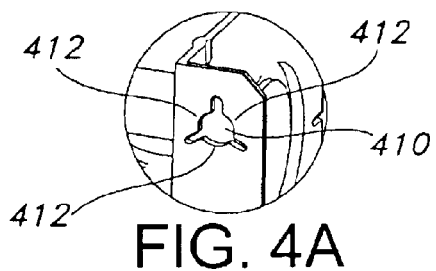
FIG. 4A
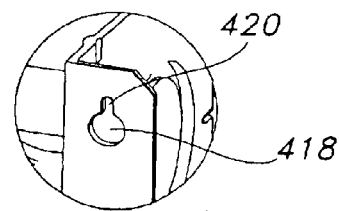
FIG. 4B
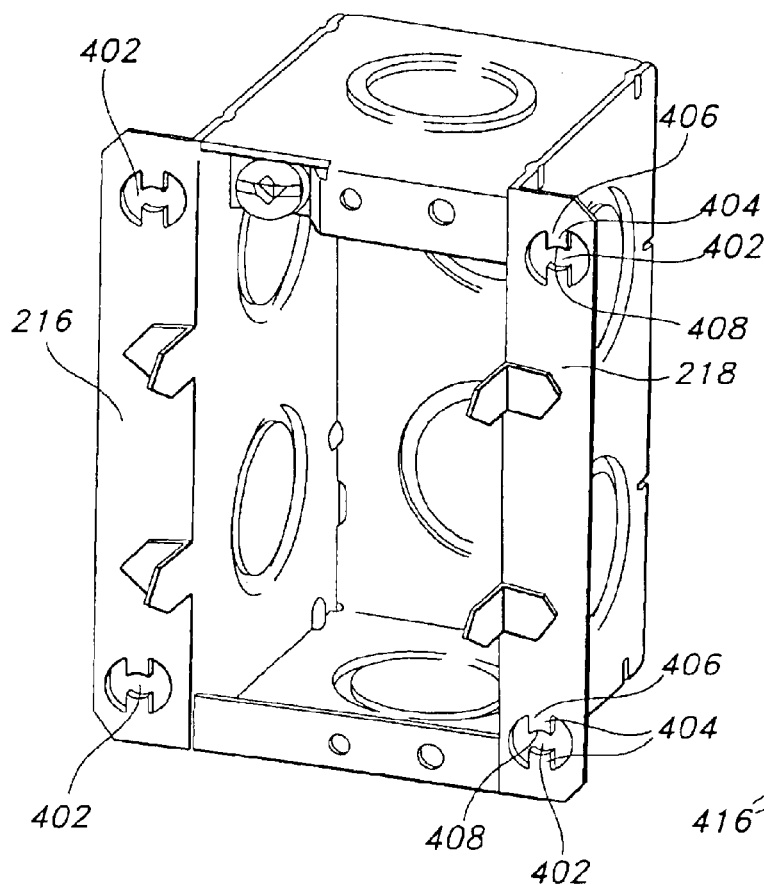
FIG. 4
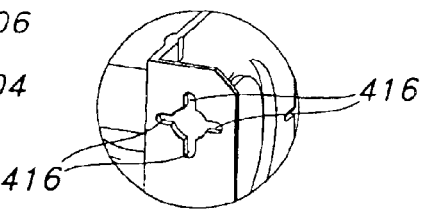
FIG. 4C
FIG. 4D
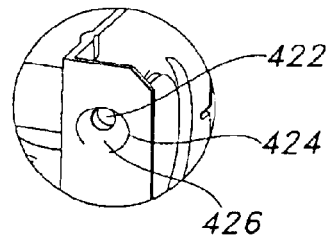
FIG. 4E

OUTLET BOX FOR CONCRETE WALLS

CROSS-REFERENCE TO RELATED APPLICATIONS

This application claims the benefit of U.S. Provisional Application No. 60/416,794 filed on Oct. 8, 2002.

FIELD OF THE INVENTION

The present invention relates generally to an electrical outlet box for housing electrical fixtures such as a switch or a receptacle. More particularly, the present invention relates to an improved electrical outlet box for use on concrete wall.

BACKGROUND OF THE INVENTION

It has long been known to house electrical fixtures such as switches and receptacles in an electrical outlet box. The outlet box permits the insertion of electrical wires into the box which are terminated to electrical fixtures. The fixtures then may be mounted to the box which provides protection to the fixtures as well as the wires terminated therein. The outlet box is then mounted to a wall at a convenient location to provide access. Most outlet boxes accommodate one or more electrical fixtures, which terminate standard 110 volt electrical wires.

Outlet boxes are available in a variety of configurations and sizes. The selection of which type of box to use is dependant upon the specifics of the application. The most commonly employed box is a single-gang outlet box, also referred to as a standard outlet box. The single-gang box is ideal for applications in which only one receptacle is required for the application. Standard outlet boxes have opening dimensions of approximately 3"×2-¼" and are available in a variety of depths. Double-gang and triple-gang boxes are also available, and they typically have the capacity to hold two and three receptacles respectively. A four inch (4") square box is also commonly employed for multiple receptacle applications.

Typically, outlet boxes are mounted by affixing mounting ears to a wall stud or other structural member. However for some applications, such as exterior uses, the outlet box, may be mounted within a concrete structure. This is accomplished by attaching the box to a form in the desired location. The form is unusually a wooden temporary structure used to contain the poured concrete in the desired shape that is removed after the concrete has hardened. The outlet box remains in the concrete after removal of the form.

It is necessary when using an outlet box in such an application to insure that it is securely affixed to the form to resist being displaced during the concrete pour. Presently, outlet boxes are affixed to the form using nails or screws. Current design boxes usually provide holes on a flange for receiving a fastener such as a nail to affix the box to a form. Upon removal of the forms, the nails (or screws) remain in the concrete, and need to be cut away in order to avoid being in the way during further work such as the installation of drywall. This requires an extra step and can leave an undesirable sharp edge or projection where the fastener was cut.

Therefore it would be desirable to have an outlet box for use in concrete walls, incorporating features which make cutting of the protruding nails or screws unnecessary.

SUMMARY OF THE INVENTION

Applicant has overcome the shortcomings of prior art outlet box with the present invention by incorporating prongs that are adapted to being hammered into a concrete form, prior to pouring concrete. Once the forms are removed, the prongs can be hammered to a position that is parallel to the wall surface.

The present invention further provides for holes that are adapted to releasably retain a fastener such that the it can be removed after the concrete has hardened.

Therefore there is provided an electrical outlet box having a generally rectangular box having a back wall, a perimetrical side wall surrounding the back wall defining an open front face and a box interior, the side wall comprised of a first and second set of generally parallel spaced apart wall portions, outwardly directed flanges extending from one set of parallel wall portions adjacent the open front face; and fastening structures integrally formed with and attached to the flanges for rigidly mounting the electrical outlet box to a structural member.

BRIEF DESCRIPTION OF THE DRAWINGS

FIGS. 4 and 4a–4e show a perspective view of various alternate embodiments of the present invention.

DETAILED DESCRIPTION OF THE PREFERRED EMBODIMENTS

Figure 1A:
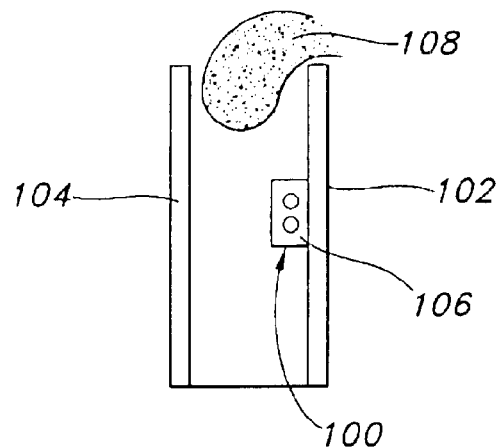
FIG. 1a–1d show in side view, a typical installation of the outlet box of the current invention.

There will be detailed below the preferred embodiments of the present invention with reference to the accompanying drawings. Like members are designated by like reference characters in all figures.

Referring now to the drawings, there is shown in FIG. 1a–1d, a typical installation of an outlet box 100 in a concrete wall application.

FIG. 1a shows a front form 102 and rear form 104, used to retain poured concrete to construct a vertical wall. As is well known, such forms may be constructed of wood stud, planks or sheets such as plywood. The side 106 of outlet box 100 is fastened to front form 102. The outlet box 100 must be securely fastened to the form when the concrete 108 is poured. Typically, the outlet box 100 is nailed to the form by driving the fastener through apertures provided on exterior flanges, of outlet box into the form. It should be noted that a wire, not shown in this view, would typically be installed in the outlet box prior to the pouring of the concrete wall.

Figure 1B:
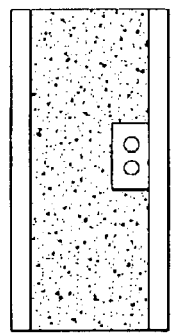

FIG. 1b depicts the outlet box 100 positioned within the wall 116 after the concrete has been poured and hardened. Secure attachment of the box 100 to the form 106 maintains the box 100 in proper position during the concrete pour.

Figure 1C:
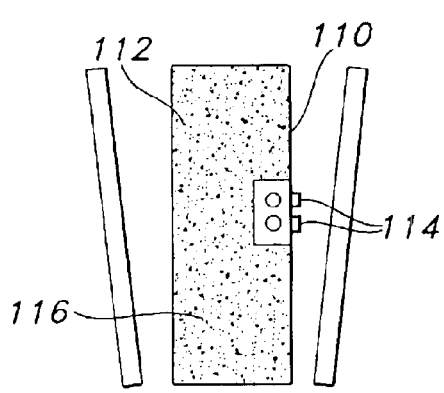
Figure 1D:
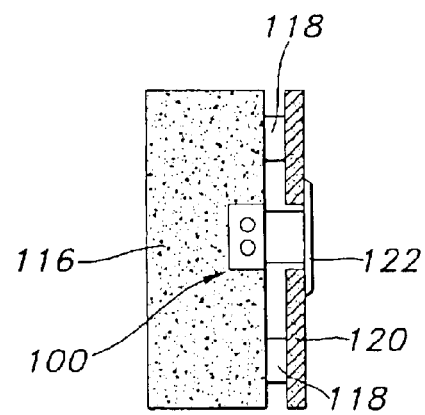

After the concrete has hardened, the forms are removed, as shown in FIG. 1c, thereby exposing the concrete wall front 110 and rear 112 surface. Removal of the forms also exposes the front of outlet box, as well as the fasteners 114 used to affix the outlet box to front form 102. In a prior art outlet box, the removal of the forms would expose the shank and point of the nail, or the screw threads which would subsequently be cut away. In accordance with the present invention, as will be explained further with reference to the FIGS. 2–4, the fasteners can be removed or flattened flush with the wall surface. FIG. 1d depicts the finished installation of outlet box 100 after removal of the fasteners, showing the concrete wall 116, furring strips 118, drywall 120 and outlet box coverplate 122.

Figure 2:
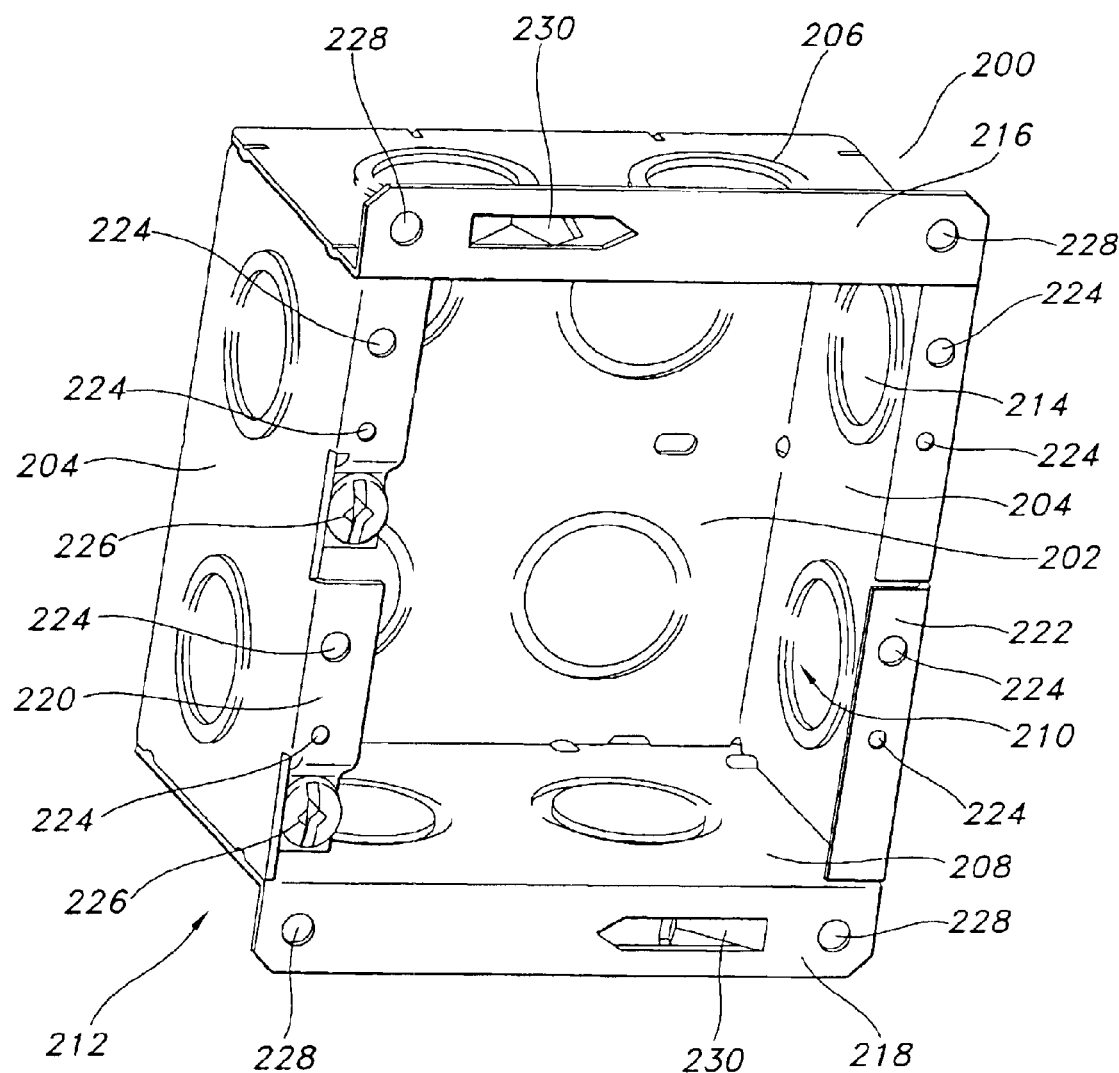
FIG. 2 is a perspective view of one embodiment of the front of the outlet box of the present invention.

Turning now to FIG. 2, there is shown an embodiment of the outlet box of the present invention. There is shown an outlet box 200 which is generally a rectangular member having a back wall 202, a pair of spaced apart side walls 204 extending from back wall 202, and opposed top and bottom walls 206 and 208. Back wall 202, side walls 204 and top and bottom walls 206 and 208 form a box interior 210 having an open front face 212 which accommodates therein an electrical fixture. Open front face 212 has a dimension substantially equivalent to the opening of a double-gang outlet box. The interior length and width of the opening will vary depending on if receptacle mounting flanges disposed on the box are interior or exterior to the box opening. However, the outlet box depicted here is illustrative and not intended to be limiting. It will be appreciated that it would be apparent to have an outlet box according to the present invention having alternate dimensions according to the application of such outlet box.

As is well known in the art, outlet box 200 may include one or more access openings, typically known as knockouts 214 which permit entry of electrical wires and cables (not shown) into box interior 210. The exterior surfaces of top 206 and bottom walls 208 include mounting flanges 216 and 218 respectively which allow the box to be secured to a concrete form or the like in conventional fashion by use of a fastener such as a nail or screw. The interior surfaces of side walls 204 include component retaining flanges 220 and 222 which include apertures 224 for receiving fasteners, usually screws, to securely mount electrical components within the outlet box and screws 226 for securely attaching a ground wire to the outlet box. Mounting flanges 216 and 218 are outwardly bent with respect to the top 206 and bottom 208 of the outlet box. Mounting flanges 216 and 218 include apertures 228 for affixing the outlet box to a concrete form in the conventional way, such as for example, by placing outlet box open face 212 against a concrete form and driving a nail (not shown) through the apertures 228 to securely mount the box to the concrete form.

Alternately, the outlet box according to the present invention includes retracted prongs 230 on mounting flanges 216 and 218 for securely attaching outlet box to a concrete form. In this exemplary embodiment, the prongs are tabs, formed from the flange material, being pointed at one end and attached to the flange at the end opposite the pointed end. Each tab is folded back along its length to form a "v" such that the pointed end is positioned toward the outlet box opening and the apex of the "v" is extended toward the back wall 202. In use outlet box open face 212 is placed against a concrete form and retracted prongs 230 are driven into the form, typically by hammering the apex of the prong to force the pointed end forward and into the form, thereby securely affixing the outlet box to the form. Upon removal of the forms, prongs 230 can be hammered flush with flanges 216 and 218.

Figure 3:
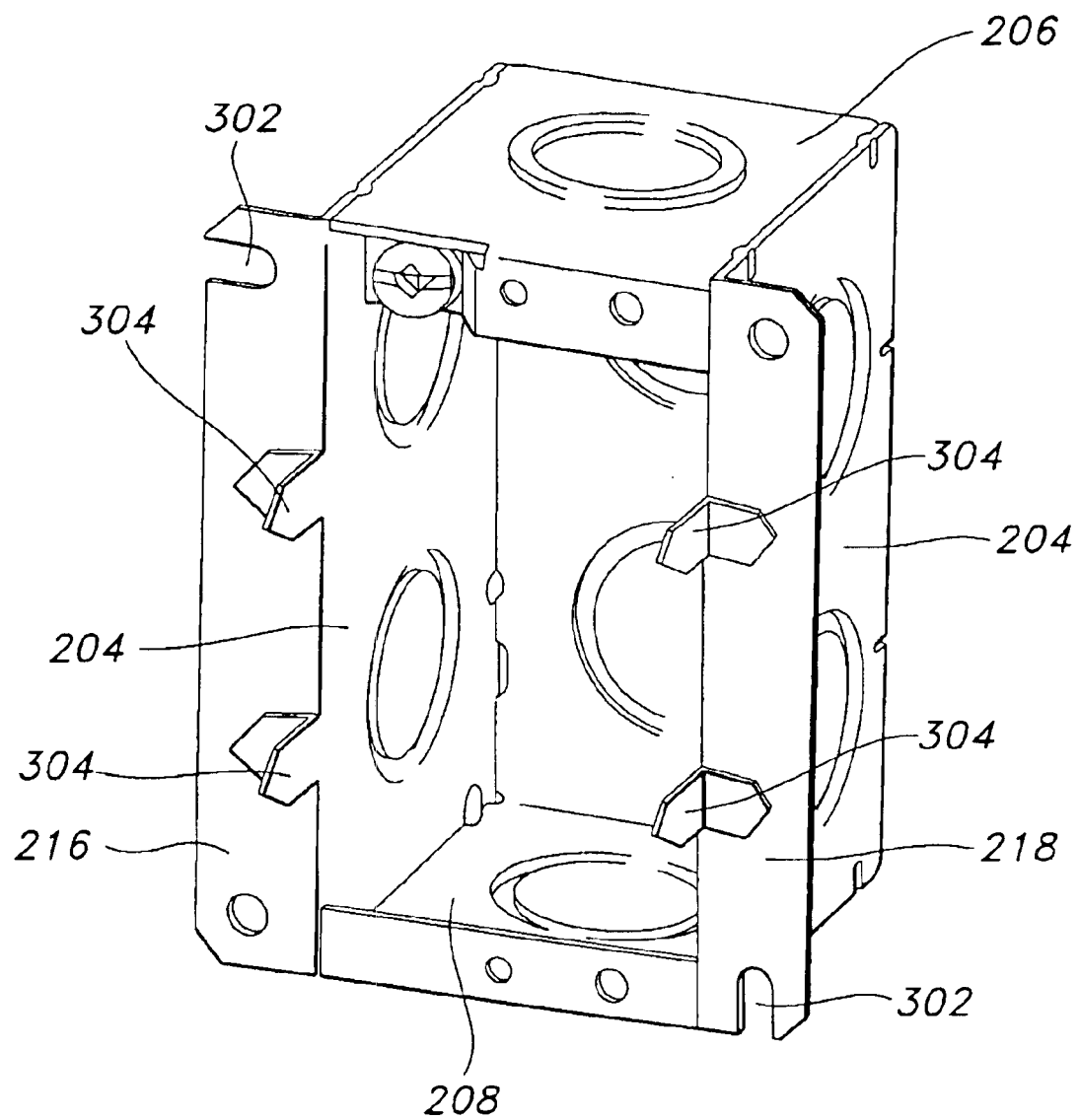
FIG. 3 is a perspective view of the front of an alternate embodiment of the present invention.

Turning now to FIG. 3, an alternate embodiment of the present invention is shown. In the embodiment of FIG. 3, outside mounting flanges 216 and 218 extend from side walls 204, inside component retaining flanges extend from top 206 and bottom 208 wall. In this embodiment flange 216 and 218 include slots 302 located at the uppermost side edge and bottom of flanges 216 and 218 respectively. Slots 302 permit the removal of a nail or screw, by providing a passage to slide out the nail head from behind the outlet box after the forms have been removed. In use, the open face 212 of outlet box 200 would be placed against a form and affixed by driving a nail into the form through slot 302. After the concrete is poured and hardened the form is removed leaving the exposed fastener point and shank. The head of the fastener is retained behind the slot by the concrete. According to the present invention, the fastener can be removed by gripping the shank of the fastener, and forcibly moving it towards the open end of the slot until the fastener head is released.

Alternately, the outlet box according to the present invention includes prongs 304 on mounting flanges 216 and 218 for securely attaching outlet box to a concrete form. In this exemplary embodiment, the prongs are tabs, formed from the flange material, being pointed at one end and attached to the flange at the end opposite the pointed end. Each tab protrudes orthogonally from the outlet box flange having the pointed end extending outwardly from flange 216 and 218. In use, outlet box open face 212 is placed against a concrete form and flange 216 and 218 are hammered towards the form whereby prongs 304 are driven into the form. Upon removal of the form, prongs 304 can be hammered flush with the surface of flange 216 and 218.

Turning now to FIG. 4, another alternate embodiment of the present invention is shown. In the embodiment of FIG. 4, outside mounting flanges 216 and 218 include apertures 402 for releasably retaining fasteners used to affix the outlet box to a concrete form. Apertures 402 can comprise either deformable or removable structures as described below.

More particularly, apertures 402 comprises a generally circular opening having an upper and lower tab 404, each having a base 406 and a tip 408 extending towards the center of the opening. Tip 408 has a semicircular profile adapted to concentrically receive the shank of a fastener such as a nail. Tabs 404 can be a plastically deformable metallic material formed integrally with flanges 216 and 218. The metallic material should be strong enough to securely affix outlet box 100 to a concrete form while allowing a fastener to be removed by pulling the head of the fastener through the aperture. After the fastener is removed, the deformed tabs can be hammered flush with the surface of flange 216 and 218. Alternately, tabs 404 can removable structures wherein the base 406 is scored, i.e partially cut through, such that the tab will break away when subjected to the force of the fastener head being pulled through the aperture.

It will be appreciated that aperture 402 can be formed of a variety of shapes and structures as shown in FIGS. 4a–e, wherein various alternate embodiments are depicted.

FIG. 4a depicts aperture 410 having a generally circular shape with three slots extending radially from the center of the aperture. In the preferred embodiment of aperture 410, the radial slots define three deformable tabs 412 that are concentric with the central circular region. Tabs 412 can be alternately removable structures as previously described with respect to apertures 402.

It should be further noted that it would be apparent to modify aperture 410 to include any number of radial slots, for example, in FIG. 4c, there is shown an aperture having two radial slots 414 extending from the generally circular center region.

Similarly, FIG. 4d, depicts an aperture having four radial slots 416 extending from the generally circular center region.

A further alternate embodiment is depicted in FIG. 4b, wherein there is shown a generally circular aperture 418, having a slot 420 extending radially from the outer circumference of the circular opening wherein the slot has a width less than the diameter of the center circular region. The slot 420 is adapted to receive the shank of a fastener, such as a nail. The slot 420 however, is smaller than the diameter of a nail head typically used it this type of application. Whereas the generally circular aperture 418 has a larger diameter than the head of a nail typically used for this type of application.

In use, the box according to the embodiment depicted in FIG. 4b, is affixed to a form by driving a nail into a form through the aperture provided. After the concrete is poured and hardened the form is removed leaving the exposed fastener point and shank, with the head of the fastener retained behind slot 420. According to the present invention, the user can remove the exposed fastener by gripping the fastener shank and moving the fastener towards the circular aperture 418 until the fastener head is released and thereby can be removed.

A further alternate embodiment is depicted in FIG. 4e, wherein there is shown an aperture 422 adapted to receive the shank of a nail or other such fastener, but having a diameter smaller than the head of a fastener typically used for this type of application. There is further provided a scored region 424 eccentrically surrounding aperture 422, defining a break away tab 426 that facilitates the removal of a portion of the flange to permit the fastener head to be removed.

In use, the box according to the embodiment depicted in FIG. 4e, is affixed to a form by driving a nail into a form through the aperture provided. After the concrete is poured and hardened the form is removed leaving the exposed fastener point and shank. The head of the fastener is retained behind scored region 424. According to the present invention, the user can remove the exposed fastener by gripping the fastener shank and pulling the fastener away from the wall, whereby the breakaway tab 426 is removed, and the fastener released.

It will be appreciated that the present invention has been described herein with reference to certain preferred or exemplary embodiments. The preferred or exemplary embodiments described herein may be modified, changed, added to or deviated from without departing from the intent, spirit and scope of the present invention. It is intended that all such additions, modifications, amendments, and/or deviations be included within the scope of the claims appended hereto.

What is claimed is:

1. An electrical outlet box for accommodating an electrical fixture comprising:

a generally rectangular box having a back wall, a perimetrical side wall surrounding said back wall defining an open front face and a box interior, said side wall comprised of a first and second set of generally parallel spaced apart wall portions, outwardly directed flanges extending from one set of parallel wall portions adjacent said open front face; and fastening structures integrally formed with and attached to said flanges for rigidly mounting said electrical outlet box to a structural member wherein said fastening structures have a first and second end, the first end attached to said flange and a free second end.

2. An electrical outlet box of claim 1 wherein said fastening structures protrude from said flanges away from said open front face.

3. An electrical outlet box of claim 1 wherein said fastening structures are extendable from said flanges away from said open front face.

4. An electrical outlet box of claim 2, wherein said free end is pointed.

5. An electrical outlet box of claim 2, wherein said free end is sharp.

6. An electrical outlet box of claim 3, wherein said free end is pointed.

7. An electrical outlet box of claim 3, wherein said free end is sharp.

8. An electrical outlet box of claim 1, wherein said flanges have a plurality of apertures for receiving a fastener, wherein said apertures have retaining structures for temporarily securing said fastener.

9. An electrical outlet box according to claim 8 wherein said retaining structures include frangible elements.

10. An electrical outlet box of claim 9 wherein said frangible element is defined by a score line permitting detachment of said frangible element.

11. An electrical outlet box according to claim 8 wherein said retaining structures include deformable elements.

12. An electrical outlet box of claim 11 wherein said deformable element is defined by a malleable portion permitting bending of said deformable element.

13. An electrical outlet box according to claim 8, wherein said apertures are configured to releasably retain said fastener.

14. An electrical outlet box according to claim 13, wherein said aperture has at least one radially extended slot.

15. An electrical outlet box of claim 1 wherein said box is formed of conductive metal.

* * * * *